A
United States Patent [19]

Chasteen

[11] 4,324,594

[45] * Apr. 13, 1982

[54] METHOD FOR CLEANING METAL PARTS

[75] Inventor: Jack W. Chasteen, Ketering, Ohio

[73] Assignee: University of Dayton, Dayton, Ohio

[ * ] Notice: The portion of the term of this patent subsequent to Feb. 12, 1997, has been disclaimed.

[21] Appl. No.: 119,060

[22] Filed: Feb. 6, 1980

Related U.S. Application Data

[63] Continuation-in-part of Ser. No. 874,915, Feb. 2, 1978, Pat. No. 4,188,237.

[51] Int. Cl.$^3$ .................................................. B08B 5/00
[52] U.S. Cl. ............................................ 134/2; 134/11; 134/19; 134/31; 134/37; 228/206
[58] Field of Search ................. 134/2, 11, 19, 31, 37; 228/206; 148/16, 20.3

[56] References Cited

U.S. PATENT DOCUMENTS

| | | | |
|---|---|---|---|
| 2,571,328 | 10/1951 | Baker | 134/2 X |
| 2,585,819 | 2/1952 | Moore et al. | 228/206 |
| 2,851,387 | 9/1958 | Low | 148/16 X |
| 4,188,237 | 2/1980 | Chasteen | 134/2 |

FOREIGN PATENT DOCUMENTS 1454217 11/1976 United Kingdom .

OTHER PUBLICATIONS

"Brazing Stainless Steel in a Stable Reducing Atmosphere of Fluoride", AWS Conference (Philadelphia, Pa.—Apr. 1977).
Watson et al., *Bureau of Mines (Report 4756)*, "Decomposition Temperatures of . . . as Indicated by Halogen Liberation", Dec. 1950.

*Primary Examiner*—Marc L. Caroff
*Attorney, Agent, or Firm*—Biebel, French & Nauman

[57] ABSTRACT

The method for cleaning metal parts, particularly crack damaged gamma prime hardened nickel alloy parts but also including stainless steels, superalloys, and solid solution superalloys in order to render them brazable or otherwise bondable. The method makes use of elemental fluorine as the primary cleaning material. A reducing gas such as hydrogen may be present. The preferred source of elemental fluorine is by thermal decomposition of a fluorocarbon resin. The cleaned part has a surface layer free of oxides and depleted of aluminum and titanium. It is brazable.

6 Claims, No Drawings

METHOD FOR CLEANING METAL PARTS

A non-exclusive, irrevocable, royalty-free license in the invention herein described, throughout the world for all purposes of the United States Government, with the power to grant sublicenses for such purposes, is hereby granted to the Government of the United States of America.

CROSS-REFERENCE TO RELATED APPLICATIONS

This application is a continuation-in-part of application Ser. No. 874,915, filed Feb. 2, 1978, now U.S. Pat. No. 4,188,237, which is specifically incorporated herein by reference.

BACKGROUND OF THE INVENTION

The present invention relates to a method for cleaning unbrazable metal parts sufficiently to render them brazable and more particularly, to a method for treating damaged gamma prime hardened alloy parts so that the parts can be repaired by brazing.

Late model gas turbine engines (for example, those on the Boeing 747, the DC-10, and the Lockheed 1011) employ in their turbine sections nickel based alloys that are gamma prime hardened. Many other engines contain such materials, and the use of gamma prime hardened alloys will no doubt increase in the future due to the desirable properties of these superalloys.

The problem is that engine parts made of such alloys are very expensive and, at present, are not repairable when crack damaged due to metal fatigue. Attempts to weld repair such components results in post-weld cracking. Likewise, conventional brazing cannot be affected because nickel-base braze alloys will not run on the gamma prime hardened surfaces. Thus, although a molten brazing alloy under high vacuum might stick new gamma prime hardened parts together, it has not previously been possible to place brazing alloy inside cracks in damaged gamma prime hardened alloy parts.

A successful braze is manifest when braze material is placed at the source of a crack (say 0.001 inch wide and one-half inch long) and, at brazing temperature, not only melts and sticks to the parent material, but also runs into and fills the length of the crack. Apparently, in use a gamma prime hardened alloy becomes oxidized (and/or sulfuridized) to the extent that the aluminum, titanium and chromium oxides (or sulfides) which coat the surface of the part, including the surfaces of the crack, prevent successful repair by brazing.

Accordingly, it has been recognized that such parts must be cleaned if they are to be brazed. One suggestion is to use chromium fluoride ($CrF_3$) and hydrogen ($H_2$) to clean damaged parts of gamma prime hardened alloys prior to a braze repair. It is speculated that the following reaction mechanism takes place:

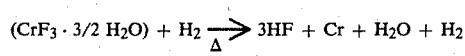

(1)

(2)

If, then, $MF_x$ is volatile at the reaction temperature, the oxide is effectively reduced and the base metal (M) should be brazable. However, uniform reproducibility of results is for some reason lacking and many parts cleaned by this process are still not brazable.

A much more effective process is that disclosed and claimed in parent application Ser. No. 874,915. However, that application is for the most part directed to cleaning crack-damaged gamma prime hardened alloys. It has now been established that a similar process is also effective in cleaning other metals, especially stainless steels, superalloys, and solid solution superalloys, as well as the gamma prime hardened nickel alloys.

It is known that stainless steel can be brazed in a stable reducing atmosphere of fluoride. In a paper presented by the Toulouse, France, Microturbo Company representatives at the American Welding Society (AWS) meeting in Philadelphia in April 1977, entitled "Brazing Stainless Steel in a Stable Reducing Atmosphere of Fluoride," there is described a brazing process carried out in a halogen atmosphere obtained by the decomposition of fluorine salts such as ammonium bifluoride acid and chromium fluoride. The proposed reactions are:

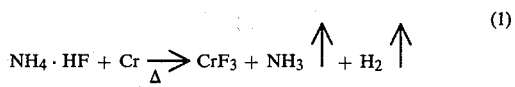

(1)

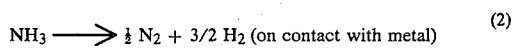

(2)

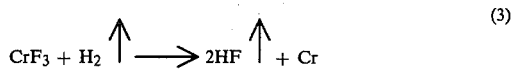

(3)

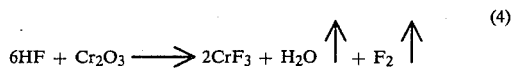

(4)

There are two pertinent observations regarding these reactions: (a) the object would appear to be the production of HF gas which, in turn, does the cleaning, and (b) any elemental fluorine that forms is produced downstream of the work piece (see reaction 4). It is noted that in the presented paper there is an indication that "the technique cannot be used on assemblies of materials having a high level of electropositivity, such as titanium and zirconium," and "it is essential to avoid the introduction of carbon into the furnace during brazing."

Similarly, Moore in U.S. Pat. No. 3,585,819, discloses a process of fluxing metal parts with a stable, non-oxidizing atmosphere containing HF gas. The metal parts are ones such as steels which are to be brazed or soldered.

Finally, reference is made to Low U.S. Pat. No. 2,851,387. Low relates to a process for nitriding high chromium stainless steels. In Low's discussion of the prior art he notes that all prior processes of depassifying such steels require immediate nitriding or the internal affects of the depassifying were lost. A specific purpose of his invention is a combined activating and nitriding operation which avoids any problems of interruption in the sequence steps. The combined operations are provided by a mixture of decomposed fluorocarbon resin gases and ammonia gas. The result is a nitrided product, but it is believed that a cleaned, brazable product would not be produced.

Accordingly, the need still exists for an effective method for cleaning metal parts to render them brazable or otherwise bondable.

SUMMARY OF THE INVENTION

That need is met by the present invention which utilizes a simple, inexpensive method for cleaning damaged gamma prime hardened alloy parts, the results of which have been found to be consistently reproducible. Those results are, in effect, what appears to be a denuding of the surface layer (10-25 microns deep) on the damaged part to substantially deplete that layer of aluminum and titanium metals and oxides (or sulfides) and also converting chromium oxides (or sulfides) to a reduced or more reducible form. This denuded surface, which extends into and along any cracks present, is brazable—the part is, therefore, braze repairable. There is little crack sensitivity in the braze repaired part once it has been re heat treated to restore all the properties common to gamma prime hardened alloy parts. The method is also useful in cleaning other alloys, whether for the purpose of repair brazing or as an initial cleaning step prior to new parts manufacture or assembly. Among the alloys cleanable are stainless steels, superalloys, and solid solution superalloys. As with the gamma prime hardened alloys, the results are excellent.

The method by which these results are achieved involves the use of elemental fluorine gas at elevated temperatures (400° to 1200° C.) to clean the damaged gamma prime hardened alloy part. Preferably, a highly reducing carrier gas, such as hyrogen, is also used. The time of treatment may vary (the longer the treatment generally, the deeper the cleaning effect), but generally 30 to 60 minutes is sufficient to achieve a 10-25 micron deep denuded surface layer.

A convenient source of elemental fluorine has been found to be fluorocarbon resins, such as polytetrafluoroethylene or polymonochlorotrifluoroethylene, which release fluorine gas upon thermal decomposition. From the literature it is known that polytetrafluoroethylene resin liberates fluorine when heated to 350° C. or higher and the rate of evolution sharply increases between 400° and 450° C. Likewise, polymonochlorotrifluoroethylene resin liberates fluorine (and chlorine) at temperatures above 250° C. and the rate of evolution increases markedly above 300° C. See, Bureau of Mines Report of Investigations 4756, "Decomposition Temperatures of Polytetrafluoroethylene and Polymonochlorotrifluoroethylene as Indicated by Halogen Liberation," United States Department of the Interior, December 1950. Other fluorocarbon resins which release fluorine gas on thermal decomposition may also be used, as can any other source of elemental fluorine.

At present nickel-based, gamma prime hardened alloys inclue INCO 713C, Mar M-200, Rene 80, Rene 95, Rene 125, Rene 41, Udimet 500, and Udimet 520. These range from low (i.e., Rene 41) to medium (i.e., INCO 713C) to high (i.e., Rene 125) levels of gamma prime hardening. All levels may be cleaned, and rendered brazable at even commercial vacuums ($10^{-2}$ to $10^{-4}$ Torr) with the instant process. As mentioned, the present process may be used to clean other types of unbrazable metal parts such as stainless steels to render them brazable; although, it finds its principal utility in the cleaning of damaged (particularly crack-damaged) gamma prime hardened alloy parts of the type mentioned.

This is because it is the only known process by which the oxides (or sulfides), including noble metal oxides, can with reproducible consistency be removed from the surface of damaged gamma prime hardened alloy parts and deplete their surfaces of aluminum and titanium. The cleaning allows nickel brazing and the aluminum and titanium depletion allows for wetting to fill cracks by the braze alloy.

Accordingly, it is an object of the present invention to provide a method for cleaning metal parts by use of elemental fluorine.

Another object of the present invention is to provide a method for cleaning damaged gamma prime hardened alloy parts to render them braze repairable.

Still another object of the invention is to provide brazable, cleaned metal parts.

Other objects and advantages of the present invention will be apparent from the following description, the accompanying drawing, and the appended claims.

DESCRIPTION OF THE PREFERRED EMBODIMENT

As mentioned, a preferred embodiment of the present invention is to utilize a thermally decomposable fluorocarbon resin along with a hydrogen gas to clean unbrazable metal parts and render them brazable at commercial vacuum levels ($10^{-2}$ to $10^{-4}$ Torr). For an alloy such as a gamma prime hardened alloy, containing chromium, aluminum, and titanium, and therefore having the corresponding oxide formed on the surface, the cleaning sequence is believed to take place as follows:

STAGE I

In this stage, the fluorocarbon resin (preferably polytetrafluoroethylene) is pyrolyzed in order to release its monomer which in turn converts the noble oxides on the surface and in cracks to their fluorides as follows:

$$Al_2O_3 + 3/2 C_2F_4 \rightarrow 2AlF_3 + 3CO$$

Here Al is used as an example. Similar reactions occur with Ti and Cr oxides.

STAGE II

The pyrolysis of the polytetrafluoroethylene is complete and the continued flow of hydrogen causes the atmosphere to become preponderantly HF gas as an active ingredient according to:

$$C_2F_4 + 6H_2 \rightarrow 4HF + 2CH_4$$

This atmosphere then causes the Al and Ti to be drawn from the surface by diffusion. On the surface, they form their volatile fluorides by the reaction:

$$Al + 3HF \rightarrow AlF_3 + 3/2 H_2$$

This stage accomplishes the depletion of a surface layer ($\approx 25\mu$) of Al and Ti so that their oxides will not reform upon exposure to the air.

At completion of Stage II, one is left with a layer of cleaned depleted alloy on the surface. On top of that is a layer of solid chromium fluoride.

STAGE III

This latter stage is entered when the atmosphere becomes preponderantly hydrogen ($H_2$). At this time the solid chromium fluoride on the surface is converted to chromium according to:

$$CrF_3 + 3/2 H_2 \rightarrow 3HF + Cr$$

The cleaning is then complete and the system is cooled. At this point, all surfaces, to a depth of $\approx 25\mu$, are essentially the parent alloy minus the Al and Ti but slightly enriched with Cr. Such a surface is brazable by standard nickel brazing techniques.

For stainless steels, only Stages I and III are applicable. In that instance the aluminum reaction shown in Stage I is not illustrative. Rather with stainless steels the critical element is chromium. According the Stage I formula for stainless steels is:

$$Cr_2O_3 + 3/2C_2F_4 \rightarrow 2CrF_3 + CO$$

The following examples are illustrative:

EXAMPLE I

In this example, a three-zone tube furnace (approximately 5¾ inch diameter) was used. The ends of the tube furnace were hermetically sealed. At one end of the furnace a gas inlet port was located. This port was connected to a supply (bottle) of carrier gas such as argon or hydrogen. The supply of that gas was controlled by a valve arrangement. At the other end of the passage through the tube furnace there was located an outlet port through which the used gases exited. The tube outlet connected via a valve to the outlet port was directed into alkali (soda) containing water traps which themselves exhausted into an exhaust hood.

Into the first zone of the three-zone furnace there was placed a supply (approximately 50 grams) of polytetrafluoroethylene resin, namely Teflon I from duPont de Nemours and various representative types of damaged gamma prime hardened alloy parts (INCO 713C) or pieces of unexposed gamma prime hardened alloy (INCO 713C and Rene 95) were placed in the second heating zone on a support grate. The outlet valve was closed and the furnace back-filled with argon gas from the inlet port.

The system was then heated to a part treatment temperature of approximately 950° C. in zone two and a resin decomposition temperature of approximately 650° C. in zone one. After initial warm-up, hydrogen gas is flowed through the passage at a rate of approximately 3 cubic feet per hour, while the temperatures are maintained. This flow was continued for approximately 60 minutes. All along the third zone is maintained as cool as possible (approximately 300° C.) to entrap monomer vapors on heat shields which were placed in the third zone for that purpose. Likewise, the outlet areas were cooled with cooling coils to room temperature or below. Following heating, the furnace was allowed to cool to 500° C. under moderate hydrogen gas flow and then with argon gas flow until the part could be removed.

An inspection of the parts reveals what appears to be a denuded surface area of approximately 10–25 microns depth. The characteristic gamma prime hardened structure represented by the fine uniform grain formation at the base is not present on the surface, and instead it is replaced by a microporous (wormy) surface layer which follows the crack and is brazable. On microscopic inspection there was revealed crystalline agglomerations of the surface aluminum and chromium as compared to the base alloy. These agglomerations are also low in nickel content compared to the base alloy. This is as a direct consequence of the cleaning process described above.

As theorized above, it is believed that there has been a depletion of aluminum and titanium and a conversion of the chromium compounds to a brazable state. At any rate, it is clear that oxides and sulfides have been removed from the cleaned parts. The parts are bright and shiny after cleaning by this process.

Similar specimens of INCO 713C, Rene 95, and Rene 80 cleaned by this process were lap joint brazed. The brazing was successful. More significantly, cleaned INCO 713C parts which had seen previous service demonstrated successful braze run performance in both high and low vacuum; whereas, portions of the same part which had been pickled but not cleaned did not demonstrate such brazing performance. And, in fact, the pickled parts demonstrated non-brazability. Other specimens (INCO 713C, unexposed) were heated to a brazing temperature in a high vacuum with a small mound of Nicrobray 200 from Wall Colmonoy Corp. brazing alloy on top. The braze alloy was observed to both adhere and wet the cleaned surface.

EXAMPLE II

In a vertical retort furnace 3.1 grams of polytetrafluorethylene resin (Teflon I) was placed in the bottom. Suspended from the top of the retort was an oxidized (1600° F., 6 hrs and grit blasted) 321 SS part—a stabilized austenitic stainless steel. An outlet tube was, as in Example I, directed into a bubbler containing alkali (1.0 g NaOH in 800 ml $H_2O$).

After an initial vacuum was drawn, the furnace was turned on, atmospheric pressure was established and a $H_2$ gas trickle started and the temperature increased to decompose the polytetrofluoroethylene resin. After about 120 minutes, the temperature reached 950° C. at which point a $H_2$ gas flow of 0.092 l/min was established. It was held at this for approximately one hour. A short (10 min.) increase in $H_2$ gas flow was used to clear the bubbler; otherwise the $H_2$ gas flow was maintained at 0.092 l/min. throughout the period. At the end of the hour, the furnace was turned off and the $H_2$ gas flow reduced to a trickle, and the part allowed to cool to 120° C. before the retort was opened (about 105 minutes after turning the furnace off).

An inspection of the part recorded a shiny clean part that was easily brazed using a nickel alloy brazing material. Similar specimens of 316 SS (another austenitic stainless steel), Hastelloy X and Hastelloy C from Union Carbide (a solid solution superalloy), and 17–7 p.H (a precipitation hardenable stainless steel) were also cleaned under the conditions set forth in this example. All were successfully brazed following this cleaning.

As can be seen from the examples, the method of the present inventin enables not only the cleaning of crack damaged gamma prime alloy parts, but also stainless steel, superalloy and solid solutions superalloy parts. Repair of gamma prime hardened alloy parts is presently the goal of ever high volume user of these alloys. Brazing is also by far the least expensive and most promising means of achieving this repair. The present invention provides a method for cleaning and the cleaned parts by which such repair can be done by brazing or by which other hard to braze parts can be cleaned sufficiently to permit brazing or other types of bonding.

While the method and product produced by that method herein described constitute a preferred embodiment of the invention, it is to be understood that the invention is not limited to this precise method and product, and that changes may be made therein without departing from the scope of the invention which is defined in the appended claims.

What is claimed is:

1. In a method for brazing or otherwise metallic bonding metal parts comprising cleaning said parts to depassivate the surface and thereafter brazing or forming a metal-metal bond, the improvement which comprises cleaning said parts by a process consisting essentially of:
   (a) placing the part in a hermetically sealed passage having inlet and outlet gas ports,
   (b) locating a fluorocarbon resin in said passage upstream of said part,
   (c) heating said fluorocarbon resin to above its decomposition temperature to release gaseous decomposition products,
   (d) introducing hydrogen gas through said inlet port and flowing it past said fluorocarbon resin and, then, past said part to carry the decomposition products through said passage and toward said outlet port and thereby subject said part to the action of the gases in said passage and render said part brazable or otherwise able to form a metal-metal bond, and
   (e) exiting the gas from said outlet port.

2. The method of claim 1 wherein said fluorocarbon resin is polytetrafluoroethylene resin.

3. The method of claim 2 wherein the gas exiting from said outlet port is treated to render it non-toxic.

4. The method of claim 1 wherein said metal part is selected from the group consisting of stainless steels, superalloys, solid solution superalloys, and gamma prime hardened nickel alloys.

5. The method of claim 1 wherein said part is subjected to the action of the gaseous decomposition products of said fluorocarbon resin and hydrogen gas without the addition of substantial amounts of other non-inert gases.

6. The method of claim 1 wherein said passage is heated to temperatures in the range 400°–1200° C.

* * * * *